US012248277B2

(12) United States Patent
Michelet et al.

(10) Patent No.: US 12,248,277 B2
(45) Date of Patent: Mar. 11, 2025

(54) SPIRAL SPRING FOR A HOROLOGICAL MOVEMENT AND MANUFACTURING METHOD THEREOF

(71) Applicant: Nivarox-FAR S.A., Le Locle (CH)

(72) Inventors: Lionel Michelet, Fleurier (CH); Christian Charbon, Chezard-St-Martin (CH); Marco Verardo, Les Bois (CH)

(73) Assignee: Nivarox-FAR S.A., Le Locle (CH)

( * ) Notice: Subject to any disclaimer, the term of this patent is extended or adjusted under 35 U.S.C. 154(b) by 419 days.

(21) Appl. No.: 17/779,659

(22) PCT Filed: Nov. 27, 2020

(86) PCT No.: PCT/EP2020/083622
§ 371 (c)(1),
(2) Date: May 25, 2022

(87) PCT Pub. No.: WO2021/105352
PCT Pub. Date: Jun. 3, 2021

(65) Prior Publication Data

US 2022/0413438 A1 Dec. 29, 2022

(30) Foreign Application Priority Data

Nov. 29, 2019 (EP) .................................... 19212457

(51) Int. Cl.
*G04B 17/06* (2006.01)

(52) U.S. Cl.
CPC .................................. *G04B 17/066* (2013.01)

(58) Field of Classification Search
None
See application file for complete search history.

(56) References Cited

U.S. PATENT DOCUMENTS 5,881,026 A * 3/1999 Baur .................... G04B 17/227 148/501
2015/0262725 A1 9/2015 Sagawa et al.
(Continued)

FOREIGN PATENT DOCUMENTS

CH 714 492 A2 6/2019
CH 714 493 A2 6/2019
(Continued)

OTHER PUBLICATIONS

Office Action issued Aug. 31, 2022, in corresponding Indian Patent Application No. 202247030208 (with English Translation), 7 pages.
(Continued)

*Primary Examiner* — Renee S Luebke
*Assistant Examiner* — Matthew Hwang
(74) *Attorney, Agent, or Firm* — Oblon, McClelland, Maier & Neustadt, L.L.P.

(57) ABSTRACT

A method for manufacturing a spiral spring may include: (a) providing a blank with an Nb—Ti core; (b) beta-quenching the blank; (c) deforming the blank in several sequences; (d) winding to form the spiral spring; (e) final heat treatment on the spiral spring. The blank in (a) may include a layer of X including Cu, Sn, Fe, Pt, Pd, Rh, Al, Au, Ni, Ag, Co and Cr or an alloy of one of these elements around the Nb—Ti core. The method may include heat treating to partially transform the layer of X into a layer of X, Ti intermetals around the Nb—Ti core, and may be carried out between (b) and (c) or between two sequences of (c). The method may include removing the part of the layer of X, which may be carried out between (b) and (c), between two sequences of (c) or between (c) and (d).

24 Claims, 2 Drawing Sheets

(56) References Cited

U.S. PATENT DOCUMENTS

| | | | |
|---|---|---|---|
| 2019/0196406 | A1 | 6/2019 | Charbon |
| 2019/0196407 | A1 | 6/2019 | Charbon |

FOREIGN PATENT DOCUMENTS

| | | | |
|---|---|---|---|
| CN | 109116712 | A | 1/2019 |
| CN | 109946945 | A | 6/2019 |
| CN | 109960132 | A | 7/2019 |
| EP | 3312297 | A1 | 4/2018 |
| EP | 3 502 288 | A1 | 6/2019 |
| EP | 3 502 289 | A1 | 6/2019 |
| EP | 3 502 288 | B1 | 10/2020 |
| JP | H09-104956 | A | 4/1997 |
| JP | 2008-231555 | A | 10/2008 |
| RU | 2 696 809 | C1 | 8/2019 |
| RU | 2 697 060 | C1 | 8/2019 |

OTHER PUBLICATIONS

Chinese Office Action issued May 6, 2024 in corresponding Chinese Application No. 202080082129.5, 7 pages.

Combined Russian Office Action and Search Report issued Dec. 20, 2022 in Russian Patent Application No. 2022117282/28 (with English Translation of Category of Cited Documents), 10 pages.

Shlyakhova et al., "Studying the Fine Structure of the Elements of the Cable of Technical Superconductors", Physics and Chemistry of Materials Processing, No. 4, 2014, pp. 80-88 (with English Abstract).

Maltseva et al., "Materials Science", Ekaterinburg: State Educational Institution of Higher Professional Education "Ural State Technical University-UPI", 2007, pp. 1-339.

Liotard et al., "Intermetallic compound formations in titanium-copper thin-film couples" Journal of Applied Physics, vol. 57, 1985, 7 pages.

Bateni et al., "The Effect of Novel Ti—Cu Intermetallic Compound Coatings on Tribological Properties of Copper", ROTRIB'03 GALATI, National Tribology Conference, Sep. 24-26, 2003, pp. 55-62.

International Search Report issued Feb. 23, 2021 in PCT/EP2020/083622, filed on Nov. 27, 2020, 3 pages.

Wilson "Advances in Low Loss NBTI Strand and Cable", WAMSDO Proceedings, XP009139537, May 2008, 6 pages.

Warnes et al. "Critical current distributions in superconducting composites", Cryogenics, vol. 26, No. 12, Dec. 1986, 12 pages.

Tachikawa et al. "Evaluations on Nb-25 wt% Ti Alloy Wires", IEEE transactions on applied superconductivity, vol. 9, No. 2, Jun. 1999, 4 pages.

* cited by examiner

SPIRAL SPRING FOR A HOROLOGICAL MOVEMENT AND MANUFACTURING METHOD THEREOF

CROSS-REFERENCE TO RELATED APPLICATIONS

The present application is the national stage of international application PCT/EP2020/083622, filed on Nov. 27, 2020, and claims the benefit of the filing date of European Appl. No. 19 212 457.6, filed on Nov. 29, 2019 .

FIELD OF INVENTION

The invention relates to a method for manufacturing a spiral spring intended to equip a balance wheel of a horological movement and the spiral spring resulting from the method.

BACKGROUND OF THE INVENTION

The manufacture of spiral springs for watchmaking must face constraints that are often incompatible at first sight:

need to obtain a high elastic limit, ease of production, in particular drawing and rolling, excellent fatigue resistance, stable performance over time, small sections.

The production of spiral springs is also centred on the concern for thermal compensation, so as to guarantee regular chronometric performances. This requires a thermoelastic coefficient close to zero. It is also sought to produce spiral springs having a limited sensitivity to magnetic fields.

New hairsprings have been developed using niobium and titanium alloys. However, these alloys pose problems of sticking and seizing in the stretching or drawing dies and against the rolling rolls, which makes them almost impossible to transform into fine wires by the standard methods used for example for steel.

To overcome this disadvantage, it has been proposed to deposit, before shaping in the dies and the rolling-mill, a layer of a ductile material, and in particular of copper, on the Nb—Ti blank. Document EP 3 502 288 thus discloses a method for manufacturing an alloy of niobium and titanium comprising between 40 and 60% by weight of titanium. The manufacturing method includes, before the deforming step, the step of depositing a surface layer of a ductile material.

This copper layer on the wire has a disadvantage. It does not allow a fine control of the geometry of the wire during the calibration and rolling of the wire. These dimensional variations of the Nb—Ti core of the wire result in significant variations in the torques of the hairsprings.

SUMMARY OF THE INVENTION

To overcome the aforementioned disadvantages, the present invention proposes a method for manufacturing a spiral spring which allows to facilitate shaping by deformation while avoiding the disadvantages associated with copper.

To this end, the method for manufacturing the spiral spring according to the invention includes a heat treatment step aiming at transforming part of the Cu layer coating the Nb—Ti core into a layer of Cu, Ti intermetals and at removing the remaining Cu layer. This layer of intermetals then forms the outer layer which is in contact with the dies and rolling rolls. It is chemically inert and ductile and allows easy drawing and rolling of the spiral wire. Another advantage is that it facilitates the separation between the hairsprings after the fixing step following winding.

The layer of intermetals is retained on the hairspring after the manufacturing method. It is sufficiently thin with a thickness comprised between 20 nm and 10 microns, preferably between 300 nm and 1.5 μm, not to significantly modify the thermoelastic coefficient (TEC) of the hairspring. It is moreover perfectly adherent to the Nb—Ti core.

The invention is more specifically described for a layer of Cu partially transformed into a layer of Cu, Ti intermetals. However, the present invention is applicable to other elements such as Sn, Fe, Pt, Pd, Rh, Al, Au, Ni, Ag, Co and Cr which are also capable of forming intermetals with Ti. It also applies to an alloy of one of these elements.

DETAILED DESCRIPTION OF THE INVENTION

Figure 1:
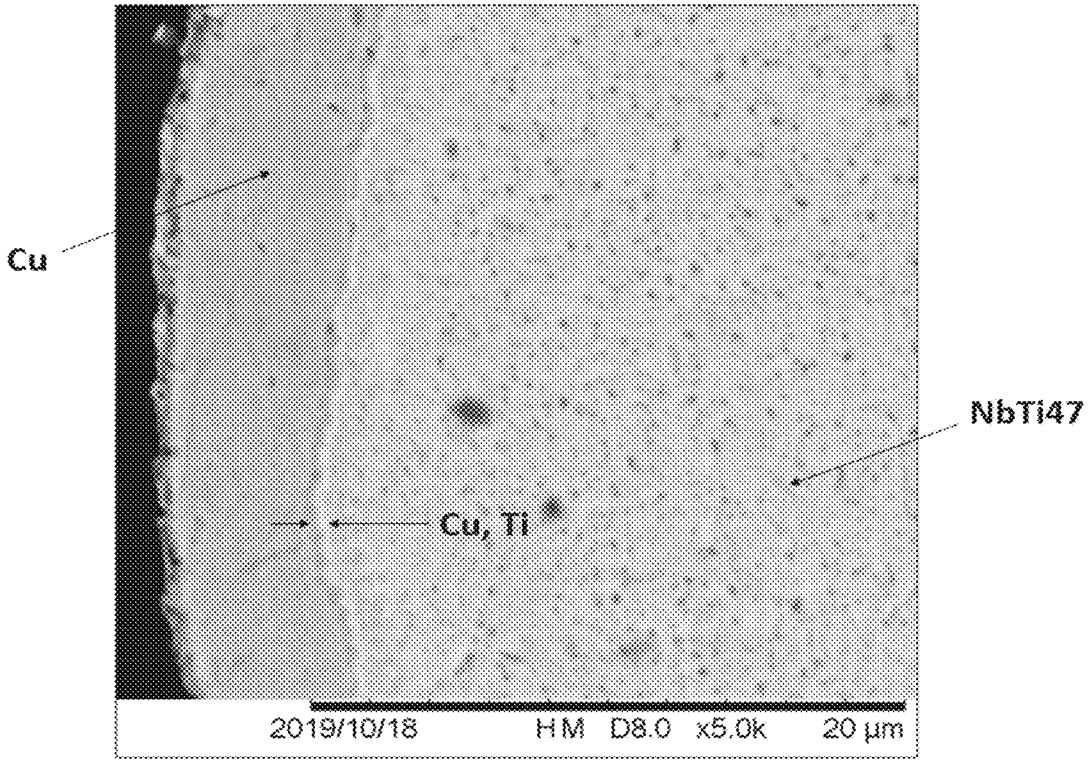
FIG. 1 shows a microscopy of the blank with a core made of the $NbTi_{47}$ alloy coated with a layer of Cu partially transformed into intermetals with the heat treatment of the method according to the invention.

The invention relates to a method for manufacturing a spiral spring intended to equip a balance wheel of a horological movement. This spiral spring is made of a binary type alloy including niobium and titanium. It also relates to the spiral spring resulting from this method.

According to the invention, the manufacturing method includes the following steps:

a) a step of providing a blank with an Nb—Ti core made of an alloy consisting of:

niobium: 100% balance by weight, titanium: between 5 and 95% by weight, traces of one or more elements selected from the group consisting of O, H, C, Fe, Ta, N, Ni, Si, Cu and Al, each of said elements being present in an amount comprised between 0 and 1600 ppm by weight, the total amount constituted by all of said elements being comprised between 0% and 0.3% by weight, b) a step of beta-quenching said blank, so that the titanium of said alloy is essentially in the form of a solid solution with the beta-phase niobium, c) a step of deforming the blank in several sequences, d) a step of winding in order to form the spiral spring, e) a step of final heat treatment on the spiral spring.

According to a variant of the invention, the blank of step a) includes a layer around the Nb—Ti core of a material X selected from among Cu, Sn, Fe, Pt, Pd, Rh, Al, Au, Ni, Ag, Co and Cr or an alloy of one of these elements. For example, it can be Cu, Cu—Sn, Cu—Ni, etc. According to another variant, the method comprises a step of supplying said material X around the Nb—Ti core to form the layer of X, said step being carried out between step a) and the deforming step c).

The manufacturing method also includes a heat treatment step to partially transform the layer of X into a layer of X, Ti intermetals around the Nb—Ti core. The heat treatment is carried out at a temperature comprised between 200 and 900° C. for 15 minutes to 100 hours. The blank thus successively comprises the Nb—Ti core, the layer of X, Ti intermetals and the remaining part of the layer of X, said step being carried out between step b) and step c) or between two sequences of the deforming step c).

The manufacturing method then includes a step of removing the remaining part of the layer of X. This step is carried out between step b) and step c), between two sequences of the deforming step c) or between step c) and step d).

The method is now described in more detail.

In step a), the core is made of an Nb—Ti alloy including between 5 and 95% by weight of titanium. According to a preferred variant, the alloy used in the present invention comprises between 40 and 60% titanium by weight. Preferably, it includes between 40 and 49% by weight of titanium, and more preferably between 46% and 48% by weight of titanium. The percentage of titanium is sufficient to obtain a maximum proportion of Ti precipitates in the form of alpha phase while being reduced to avoid the formation of martensitic phase leading to problems of brittleness of the alloy during its implementation. According to another variant, the titanium content is more significantly reduced to avoid the formation of these hard phases. The titanium content is then less than 40% by weight. It is comprised between 5 and 40% by weight (upper limit not comprised). More particularly, it is comprised between 5 and 35%, preferably between 15 and 35% and more preferably between 27 and 33%.

In a particularly advantageous manner, the Nb—Ti alloy used in the present invention does not comprise other elements except for possible and inevitable traces. This prevents the formation of brittle phases.

More particularly, the oxygen content is less than or equal to 0.10% by weight of the total, or even less than or equal to 0.085% by weight of the total.

More particularly, the tantalum content is less than or equal to 0.10% by weight of the total.

More particularly, the carbon content is less than or equal to 0.04% by weight of the total, in particular less than or equal to 0.020% by weight of the total, or even less than or equal to 0.0175% by weight of the total.

More particularly, the iron content is less than or equal to 0.03% by weight of the total, in particular less than or equal to 0.025% by weight of the total, or even less than or equal to 0.020% by weight of the total.

More particularly, the nitrogen content is less than or equal to 0.02% by weight of the total, in particular less than or equal to 0.015% by weight of the total, or even less than or equal to 0.0075% by weight of the total.

More particularly, the hydrogen content is less than or equal to 0.01% by weight of the total, in particular less than or equal to 0.0035% by weight of the total, or even less than or equal to 0.0005% by weight of the total.

More particularly, the silicon content is less than or equal to 0.01% by weight of the total.

More particularly, the nickel content is less than or equal to 0.01% by weight of the total, in particular less than or equal to 0.16% by weight of the total.

More particularly, the content of ductile material, such as copper, in the alloy, is less than or equal to 0.01% by weight of the total, in particular less than or equal to 0.005% by weight of the total.

More particularly, the aluminium content is less than or equal to 0.01% by weight of the total.

According to the invention, the Nb—Ti core of the blank in step a) is coated with a layer of material X as listed above. The supply of the layer of X around the core can be carried out by galvanic way, by PVD, CVD or by mechanical way. In the latter case, a tube of material X is fitted to a bar of the Nb—Ti alloy. The assembly is deformed by hammering, stretching and/or drawing to thin the bar and form the blank provided in step a). The present invention does not exclude supplying the layer of X during the method for manufacturing the spiral spring between step a) and the deforming step c). The thickness of the layer of X is selected so that the surface ratio of material X/surface of the Nb—Ti core for a given wire section is less than 1, preferably less than 0.5, and more preferably comprised between 0.01 and 0.4. For example, the thickness is preferably comprised between 1 and 500 micrometres for a wire having a total diameter of 0.2 to 1 millimetre.

The beta-quenching in step b) is a dissolution treatment. Preferably, it is carried out for a duration comprised between 5 minutes and 2 hours at a temperature comprised between 700° C. and 1000° C., under vacuum, followed by cooling under gas. More specifically, this beta-quenching is a solution treatment at 800° C. under vacuum for 5 minutes to 1 hour, followed by cooling under gas.

The deforming step c) is carried out in several sequences. Deformation means a deformation by drawing and/or rolling. Advantageously, the deforming step includes at least successively a first drawing sequence, a second calibration drawing sequence and a third rolling sequence, preferably with a rectangular profile compatible with the entry section of a winding pin. Each sequence is performed with a given deformation rate comprised between 1 and 5, this deformation rate is according to the classic formula 2 ln(d0/d), where d0 is the diameter of the last beta quenching, and where d is the diameter of the hardened wire. The global accumulation of the deformations on the whole of this succession of sequences leads to a total deformation rate comprised between 1 and 14.

According to the invention, the manufacturing method includes the heat treatment step to partially transform the layer of X into a layer of X, Ti intermetals around the Nb—Ti core. This step is carried out for 15 minutes to 100 hours at a temperature comprised between 200 and 900° C. Preferably, it is carried out for 5 to 20 hours between 400 and 500° C. This heat treatment step can be used to precipitate the alpha-phase titanium.

Figure 2:
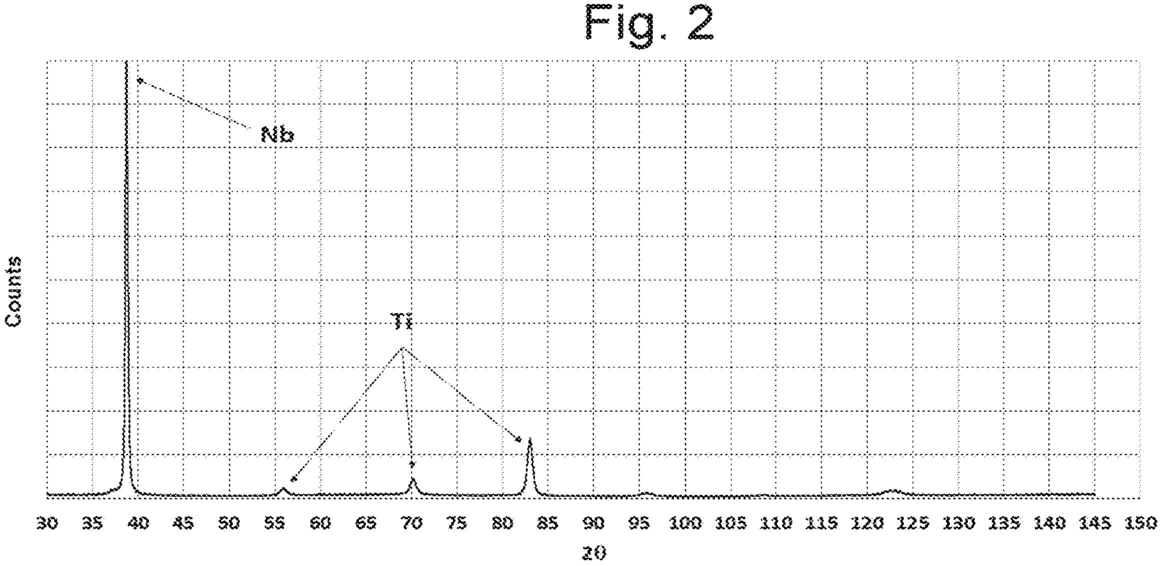
FIG. 2 shows, according to the prior art, the XRD spectrum of this alloy with the Cu layer in the absence of the heat treatment according to the method of the invention.
Figure 3:
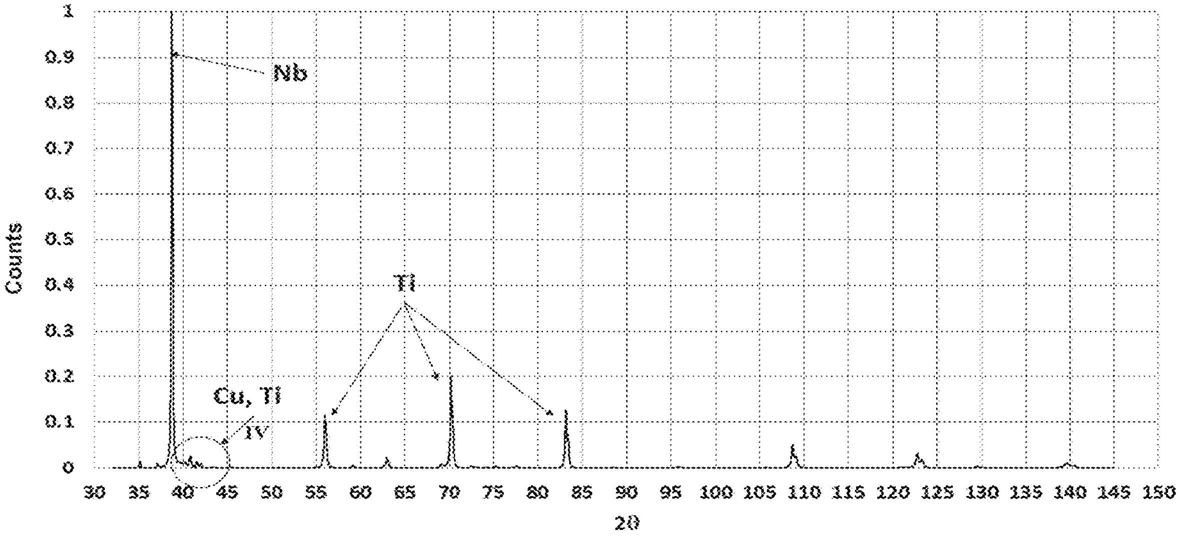
FIG. 3 shows the XRD spectrum of this same alloy with the Cu layer in the presence of the heat treatment according to the method of the invention.
Figure 4:
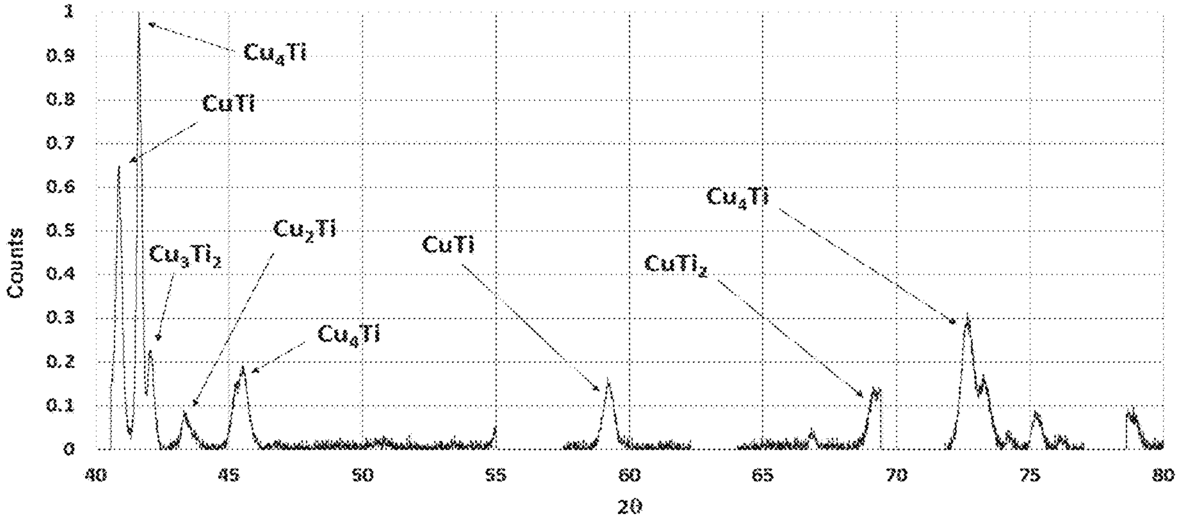
FIG. 4 is an enlargement of the XRD spectrum of FIG. 3 for the peaks relating to the intermetals.

At the end of this step, the layer of intermetals has a thickness comprised between 20 nm and 10 μm, preferably between 300 nm and 1.5 μm, and even more preferably between 400 and 800 nm and even more preferably between 400 and 600 nm. The remaining layer of X has a thickness comprised between 1 and 25 μm. In the case of Cu, the layer of intermetals includes, for example, $Cu_4Ti$, $Cu_2Ti$, CuTi, $Cu_3Ti_2$ and $CuTi_2$. By way of illustration, the microscopy in FIG. 1 represents the structure of the blank after heat treatment at 450° C. of a niobium-titanium alloy with 47% by weight of titanium covered with a copper layer. The $NbTi_{47}$ core, the layer of Cu, Ti intermetals having a thickness of about 700 nm and the remaining copper layer having a thickness of about 5 μm are successively observed. FIG. 3 shows the XRD spectrum for this same alloy of the spiral spring according to the invention after removal of the Cu layer and after the winding and fixing steps. For comparison, the XRD spectrum for this same alloy with the copper layer but in the absence of the heat treatment is shown in FIG. 2. A series of small peaks is observed next to the Nb peak which are shown enlarged in FIG. 4. There are peaks for $Cu_4Ti$, $Cu_2Ti$, CuTi, $Cu_3Ti_2$ and $CuTi_2$.

This heat treatment aiming at forming intermetals can be carried out before the deforming step c) or between two deformation sequences during step c). Advantageously, it is carried out in step c) between the first drawing sequence and the second calibration drawing sequence.

Then, the remaining layer of X is removed so as to have the layer of intermetals as the outer layer. This step can be carried out by chemical attack in a solution based on cyanides or acids, for example nitric acid. It should be specified that the present invention does not exclude that certain intermetals are also dissolved in the acid. This is for example the case of $Cu_4Ti$ in a nitric acid solution.

The layer of X can be removed at different times in the method depending on the desired effect. Preferably, it is removed in step c) before the calibration drawing so as to very finely control the final dimensions of the spiral wire. The intermetals present in the outer layer then prevent the wire from sticking in the dies, against the rolling rollers and between the hairsprings during fixing. More preferably, it is removed between the first drawing sequence and the second calibration drawing sequence. According to a less advantageous variant, it is removed after the calibration drawing before rolling, so as to prevent the wire from sticking against the rolling rolls and between the hairsprings during fixing. According to a variant that is also less advantageous, it is removed at the end of the deforming step c) before the winding step. In this case, the outer layer of intermetals only prevents sticking between the hairsprings during fixing.

Step d) of winding to form the spiral spring is followed by step e) of final heat treatment on the spiral spring. This final heat treatment is a treatment of precipitating alpha-phase Ti of a duration comprised between 1 and 80 hours, preferably between 5 and 30 hours, at a temperature comprised between 350 and 700° C., preferably between 400 and 600° C.

Finally, it will be specified that the method may include intermediate heat treatments between the deformation sequences in this same range of times and temperatures.

The spiral spring produced according to this method has an elastic limit greater than or equal to 500 MPa, preferably greater than 600 MPa, and more precisely comprised between 500 and 1000 MPa. Advantageously, it has a modulus of elasticity less than or equal to 120 GPa, and preferably less than or equal to 100 GPa.

The spiral spring includes an Nb—Ti core coated with a layer of X, Ti intermetals with X selected from among Cu, Sn, Fe, Pt, Pd, Rh, Al, Au, Ni, Ag, Co and Cr or an alloy of one of these elements, said layer of intermetals having a thickness comprised between 20 nm and 10 μm, preferably between 300 nm and 1.5 μm, more preferably between 400 nm and 800 nm, or even between 400 nm and 600 n. Preferably, the layer of intermetals is a Cu, Ti layer.

The spiral spring core has a bi-phase microstructure including beta-phase niobium and alpha-phase titanium.

Furthermore, the spiral spring produced according to the invention has a thermoelastic coefficient, also called TEC, enabling it to guarantee maintaining the chronometric performance despite the variation in the temperatures of use of a watch incorporating such a spiral spring.

The method of the invention allows the production, and more particularly the shaping, of a spiral spring for a balance wheel made of an alloy of the niobium-titanium type, typically containing 47% by weight of titanium (40-60%). This alloy has high mechanical properties, combining a very high elastic limit, greater than 600 MPa, and a very low modulus of elasticity, around 60 Gpa to 80 GPa. This combination of properties is well suited for a spiral spring. In addition, such an alloy is paramagnetic.

The invention claimed is:

1. A method for manufacturing a spiral spring suitable to equip a balance wheel of a horological movement, the method comprising:

(b) beta-quenching a blank comprising an Nb—Ti core consisting of titanium, one or more trace elements, and a remainder of niobium, so that the titanium of the Nb—Ti core is in the form of a solid solution with the niobium in beta-phase, the trace elements being O, H, C, Fe, Ta, N, Ni, Si, Cu, and/or Al, each of the trace elements being present in a range of from 0 to 1600 ppm by weight, a total amount of all of the elements being in a range of from 0 to 0.3 wt. %;

(c) deforming the blank in at least two sequences;

(d) winding in order to form the spiral spring; and (e) final heat treatment on the spiral spring;

wherein either (i) the blank in the beta-quenching (b) comprises, around the Nb—Ti core, a layer of X with a material X comprising Cu, Sn, Fe, Pt, Pd, Rh, Al, Au, Ni, Ag, Co, and/or Cr, or (ii) the method comprises supplying the material X around the Nb—Ti core to form the layer of X anytime between before the beta-quenching and the deforming (c), wherein the method further comprises a transformative heat treatment for a time period in a range of from 15 minutes to 100 hours, at a temperature in a range of from 200 to 900° C., to partially transform the layer of X into a layer of X,Ti intermetals around the Nb—Ti core, the blank thus successively comprising the Nb—Ti core, the layer of X, Ti intermetals, and part of the layer of X, the transformative heat treatment being carried out between the beta-quenching (b) and the deforming (c) or between two sequences of the deforming (c), wherein the layer of X,Ti intermetals has a thickness in a range of from 20 nm to 10 μm, and wherein the method further comprises removing the part of the layer of X, the removing being carried out between the beta-quenching (b) and the deforming (c), between two sequences of the deforming (c), or between the deforming (c) and the winding (d).

2. The method of claim 1, wherein the deforming (c) comprises, successively, a first drawing sequence, a second calibration drawing sequence, and a third rolling sequence.

3. The method of claim 2, wherein the removing of the part of the layer of X is carried out between the second sequence and the third sequence of the deforming (c).

4. The method of claim 2, wherein the removing of the part of the layer of X is carried out between the deforming (c) and the winding (d).

5. The method of claim 1, wherein the transformative heat treatment is carried out between a first sequence and a second sequence of the deforming (c).

6. The method of claim 5, wherein the transformative heat treatment is carried out between the first sequence and the second sequence of the deforming (c).

7. The method of claim 6, wherein the removing of the part of the layer of X is carried out between the first sequence and the second sequence.

8. The method of claim 1, wherein the removing of the part of the layer of X comprises a chemical attack in a solution comprising a cyanide or acid.

9. The method of claim 1, wherein the beta-quenching comprises a dissolution heat treatment, and wherein the dissolution heat treatment has a duration in a range of from 5 minutes and 2 hours, at a temperature in a range of from 700 to 1000° C., under vacuum, followed by cooling under gas.

10. The method of claim 1, wherein the final heat treatment (e) comprises precipitating alpha-phase titanium for a duration in a range of from 1 to 80 hours, at a temperature in a range of from 350 to 700° C.

11. The method of claim 1, further comprising, between at least two of the sequences of the deforming (c):

an intermediate heat treatment comprising precipitating alpha-phase titanium for a duration in a range of from 1 to 80 hours at a temperature in a range of from 350 to 700° C.

12. The method of claim 1, wherein the layer of X has a thickness in a range of from 1 to 500 μm.

13. The method of claim 1, wherein each sequence of the deforming (c) is performed with a deformation rate in a range of from 1 to 5, the deformation rate being calculated as 2 ln(d0/d), with d0 being a diameter of a final beta-quenching, and d being a diameter of the hardened wire, and wherein a global accumulation of deformations over all the sequences of the deforming (c) leading to a total deformation rate in a range of from 2 to 14.

14. The method of claim 1, wherein the Ti content is in a range of from 40 to 55% by weight.

15. The method of claim 1, wherein the Ti content is in a range of from 5 to less than 40%.

16. A spiral spring suitable to equip a balance wheel of a horological movement, the spring comprising:

an Nb—Ti core comprising an alloy consisting of:

titanium in a range of from 5 to 95% by weight, traces of one or more elements selected from the group consisting of O, H, C, Fe, Ta, N, Ni, Si, Cu, and Al, each of the elements being present in a range of from 0 to 1600 ppm by weight, a total amount constituted by all of the elements being in a range of from 0 to 0.3% by weight; and a remainder of niobium, wherein the Nb—Ti core is coated with a layer of X,Ti intermetals with X comprising Cu, Sn, Fe, Pt, Pd, Rh, Al, Au, Ni, Ag, Co, and/or Cr, the layer of intermetals having a thickness in a range of from 20 nm to 10 μm.

17. The spiral spring of claim 16, wherein the layer of intermetals has a thickness in a range of from 300 nm to 1.5 μm.

18. The spiral spring of claim 16, wherein the layer of intermetals has a thickness in a range of from 400 to 800 nm.

19. The spiral spring of claim 16, wherein X is Cu and the layer of intermetals comprises $Cu_2Ti$, CuTi, $Cu_3Ti_2$, and $CuTi_2$.

20. The spiral spring of claim 16, wherein the Ti content is in a range of from 40 to 55% by weight.

21. The spiral spring of claim 16, wherein the Ti content is in a range of from 5 to less than 40%.

22. The spiral spring of claim 21, wherein that the Ti content is in a range of from 5 to 35%.

23. The spiral spring of claim 16, wherein the Nb—Ti core has a bi-phase microstructure comprising beta-phase niobium and alpha-phase titanium.

24. The spiral spring of claim 16, having an elastic limit greater than or equal to 500 MPa, and a modulus of elasticity less than or equal to 120 GPa.

* * * * *